(12) United States Patent
Kim

(10) Patent No.: US 7,545,455 B2
(45) Date of Patent: Jun. 9, 2009

(54) BRACKET FOR LIQUID CRYSTAL DISPLAY DEVICE

(75) Inventor: Yong Sang Kim, Cheongju-shi (KR)

(73) Assignee: LG Display Co., Ltd., Seoul (KR)

( * ) Notice: Subject to any disclaimer, the term of this patent is extended or adjusted under 35 U.S.C. 154(b) by 262 days.

(21) Appl. No.: 10/943,996

(22) Filed: Sep. 20, 2004

(65) Prior Publication Data

US 2005/0062900 A1    Mar. 24, 2005

(30) Foreign Application Priority Data

Sep. 19, 2003   (KR) ...................... 10-2003-0065166

(51) Int. Cl.
  *G02F 1/1333*   (2006.01)
(52) U.S. Cl. ............................. 349/58; 349/61; 349/62; 349/63; 349/64; 349/65; 349/66; 349/67; 349/68; 349/69; 349/70; 349/71
(58) Field of Classification Search .................. 349/58, 349/61–71; 361/681
See application file for complete search history.

(56) References Cited

U.S. PATENT DOCUMENTS

| 7,474,364 | B2 * | 1/2009 | Won et al. | 349/58 |
| 2004/0090567 | A1 * | 5/2004 | Lee et al. | 349/58 |
| 2004/0252254 | A1 * | 12/2004 | Koo et al. | 349/58 |

* cited by examiner

*Primary Examiner*—David Nelms
*Assistant Examiner*—Thanh-Nhan P Nguyen
(74) *Attorney, Agent, or Firm*—McKenna Long & Aldridge LLP

(57) ABSTRACT

A liquid crystal display device is provided. The LCD device includes a top case, an inverter and a bracket. The top case surrounds a periphery of a liquid crystal display panel which displays a picture. The inverter supplies a high voltage AC power to a lamp which projects a light to the liquid crystal display panel. The bracket fastens to the top case and includes at least two fastening parts for insertion of opposite ends of the inverter, thereby reducing fabrication times for devices implementing the present invention and improving productivity.

13 Claims, 3 Drawing Sheets

BRACKET FOR LIQUID CRYSTAL DISPLAY DEVICE

This application claims the benefit of the Korean Application No. P2003-65166 filed on Sep. 19, 2003, which is hereby incorporated by reference.

BACKGROUND OF THE INVENTION

1. Field of the Invention

The present invention relates to liquid crystal display (LCD) devices, and more particularly, to a bracket for an LCD device and to a method of assembling a LCD device having the bracket.

2. Background of the Related Art

Cathode Ray Tubes (CRT) are typically used in measuring instruments, and monitors, such as televisions. However, the weight and size of CRTs do not make them practical for small, light weight devices.

Therefore, LCD displays having an electro-optical effect applied thereto, Plasma Display Panels (PDP) having a gas discharge applied thereto, and Electro Luminescence Displays (ELD) having an electro luminescence applied thereto have been developed to address the shortcomings of CRTs.

Of the aforementioned displays, LCDs are the most widely used due to their good visibility, low average power consumption, and low heat generation compared to a same sized CRT.

However, as the LCD is a non-emissive type display device which does not emit light, a separate external light source is required. In some instances, an ambient natural light may be used. However, the environment in which the LCD operates may impose many limitations on the device, thereby making the use of ambient light impractical. Accordingly, an independent light source is provided.

Typically, this type of independent light source is called back light unit. Commonly, the back light unit employs an Electro Luminescence (EL) device, Light Emitting Diode (LED), Cold Cathode Fluorescent Lamp (CCFL), Hot Cathode Fluorescent Lamp (HCFL), or the like as the light source.

However, a voltage higher than 2000V is required for driving a CCFL. Thus, a device employing a CCFL requires an inverter for converting a DC voltage and boosting the voltage enough to drive the CCFL.

A related art LCD and a bracket thereof will be described with reference to FIG. 1 which illustrates a perspective view of a related art LCD.

Referring to FIG. 1, a related art LCD is provided with a liquid crystal display panel 10, a top case 70 on the liquid crystal display panel 10, and a back light assembly under the liquid crystal display panel 10. The back light assembly projects light through a back surface of the liquid crystal display panel 10.

The liquid crystal display panel 10 has liquid crystals injected between a pair of substrates for displaying a picture. The top case 70 encloses the liquid crystal display panel 10 and the back light assembly.

The back light assembly includes a support frame 30, a bottom cover 40, and a lamp 60 for projecting light through the back of the liquid crystal display panel 10.

The support frame 30, which is located at the under side of the liquid crystal panel 10, has a space for receiving and holding the liquid crystal panel 10 and the lamp 60. The bottom cover 40, located at the bottom of the support frame 30, protects the lamp 60 and prevents light leakage. In general, the support frame 30 is formed of plastic, and the bottom cover 40 is formed of a metal with a thermal conductivity better than plastic, such as aluminum.

In addition, the LCD in FIG. 1 has a light guide plate 52 at a side of the lamp 60 for providing uniform light illumination of the liquid crystal display panel 10.

The back light assembly will now be described.

The light guide plate 52 at the side of the lamp 60 directs light from the lamp 60 toward the LCD display panel 10 uniformly. A reflective plate 50 under the light guide plate 52 reflects light leaking in a direction opposite to the liquid crystal display panel 10 toward the light guide plate 52.

Optical sheets 54, such as a diffuser sheet, a prism sheet, and a protection sheet are disposed on the light guide plate 52 in succession. The diffuser sheet diffuses light from the light guide plate 52 thereby uniformly diffusing light. The prism sheet converges the light diffused at the diffuser sheet. The protection sheet protects the prism sheet, and uniformly diffuses any incident light.

In general, one lamp 60 is needed with a small sized liquid crystal display device at the side of the light guide plate 52. However, larger liquid crystal display devices require at least two lamps 60 mounted at the side of the light guide plate for adequate luminance.

Furthermore, the top case 70 also includes a bracket 80 for fastening an inverter 90 thereto that supplies power to the lamp 60.

FIG. 2 illustrates a perspective view of a related art bracket.

Referring to FIG. 2, the related art bracket 80 includes a fourth plate 81 having screw holes 81a formed therein, and first and fifth plates 82 and 83. The fourth and fifth plates 81, 83 extend in the same direction from opposite edges of the first plate 82.

A width of the ends of the fourth plate 81 are smaller than a width of a middle portion of the fourth plate 81. The fourth plate 81 also has a plurality of screw holes 81a that facilitate fastening with the top case 70.

The first plate 82 is bent perpendicular relative to the fourth plate 81 from the middle section of the fourth plate 81. Additionally, the fifth plate 83 is bent perpendicular relative to the first plate 82 from a middle section of the first plate 82 such that the fourth plate 81 and the fifth plate 83 are parallel to each other.

In addition, the fourth plate 81 has a fastening part comprising a second plate 84 which extends from one end of the fourth plate 81. In addition, the fourth plate 81 includes a step 81b formed thereon. A width of the fourth plate 81 where the fastening part is formed thereon is smaller than a width of the plate where the step 81b is formed. The step 81b, which positions the inverter 90, together with the bracket 80 and the inverter 90, will be described in more detail below.

The fastening part comprising the second plate 84 extends from the fourth plate 81 to a height which is lower than the height at which the first plate 82 extends from the fourth plate 81. In addition, one end 84b of the second plate 84 is bent at a right angle in a direction of the first plate 82 thereby creating a '⊓' form.

The second plate 84 of the fastening part also has a fastening hole 84a for fastening a screw (not shown). The screw allows for rigid fastening of the inverter 90 to the top case 70. The first plate 82 includes two face tape 85 on an outside surface of the first plate 82 that also fastens the inverter 90.

A process for fastening the inverter 90 to the related art bracket 80 will now be described.

After inserting the inverter 90 between the fastening part comprising the second plate 84 and the first plate 82 with the inverter 90 slanted, the inverter 90 is pushed to where the step 81b is formed. When an end of the inverter 90 is positioned at the step 81b, a middle section of the inverter 90 is seated on the first plate 82. In this instance, a cover paper covering the two face tape 85 adhered to the first plate 82 is peeled off, such that the inverter 90 attaches to the first plate 82 with the two face tape 85.

FIG. 3 illustrates a perspective view of the inverter 90 fastened to a related art bracket 80.

Referring to FIG. 3, once the inverter 90 fastens with the first plate 82 and the two face tape 85, the plates 81, 82, and 83, surround upper and lower ends of the inverter 90, thereby securely holding the inverter 90.

A screw is then inserted in the fastening hole 84a in the second plate 84 of the fastening part, thereby fastening the inverter 90 with the bracket 80.

However, the related art bracket has the following problems.

First, the use of two face tape for fastening the inverter to the bracket requires the cumbersome task of peeling the cover of the two face tape in order to attach the inverter with the bracket.

Second, the attachment of the inverter to the bracket with the two face tape makes detachment of the inverter for inspection and the like inconvenient, and is liable to damage the inverter during detachment.

SUMMARY OF THE INVENTION

Accordingly, the present invention is directed to a liquid crystal display device and a method of assembling said device that substantially obviates one or more of the problems due to limitations and disadvantages of the related art.

An advantage of the present invention is to provide a liquid crystal display device in which an inverter may be fastened to a bracket without two face tape, thereby improving workability and productivity, and providing a method of assembling such an LCD device.

Additional features and advantages of the invention will be set forth in the description which follows, and in part will be apparent to those having ordinary skill in the art upon examination of the following or may be learned from practice of the invention. The advantages of the invention will be realized and attained by the structure particularly pointed out in the written description and claims hereof as well as the appended drawings.

To achieve these advantages and in accordance with the purpose of the present invention, as embodied and broadly described herein, a liquid crystal display device includes a top case for surrounding a periphery of a liquid crystal display panel, an inverter for supplying a high voltage AC power to a lamp, and a bracket for fastening the inverter to the top case, wherein the bracket has at least two fastening parts for fastening the inverter.

The bracket has fastening parts for inserting opposite ends of the inverter, respectively.

According to an embodiment of the invention, the bracket comprises a first plate, a second plate of a first fastening part below or lower than a first end of said first plate, and a third plate of a second fastening part below or lower than a second end of said first plate opposite said first end, wherein all plates are in parallel.

According to another embodiment, a gap between the first plate and the second plate along the direction from the third plate to the second plate is provided to facilitate the insertion of the inverter into the first fastening part. To this end, the second plate also has a ramp on a side nearest the third plate. This ramp faces the first plate.

According to a further embodiment of the invention, the third plate may be formed by bending the second end of the first plate, thereby facilitating production of the second fastening part. The inverter comprises an elongated rectangular thin plate having a length such that both ends thereof are simultaneously positioned on said second plate and said third plate. Moreover, the rectangular plate may have a width which corresponds to a distance between the fourth plate and the fifth plate in order to precisely position the inverter on the bracket.

A method for assembling a liquid crystal display device having an inverter comprises the following: inserting one end of the inverter plate into a gap from below the first plate while keeping the inverter plate at an acute angle to the first plate; moving the inverter plate against the lower surface of the first plate; and shifting the inverter plate toward the third plate such that the other end of said inverter plate is positioned between the third plate and the first plate. The inverter plate may then be fixed by a screw inserted into the screw hole of the second plate.

It is to be understood that both the foregoing description and the following detailed description of the present invention are exemplary and explanatory and are intended to provide further explanation of the invention claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

In the drawings.

DETAILED DESCRIPTION OF THE PREFERRED EMBODIMENT

Figure 1:
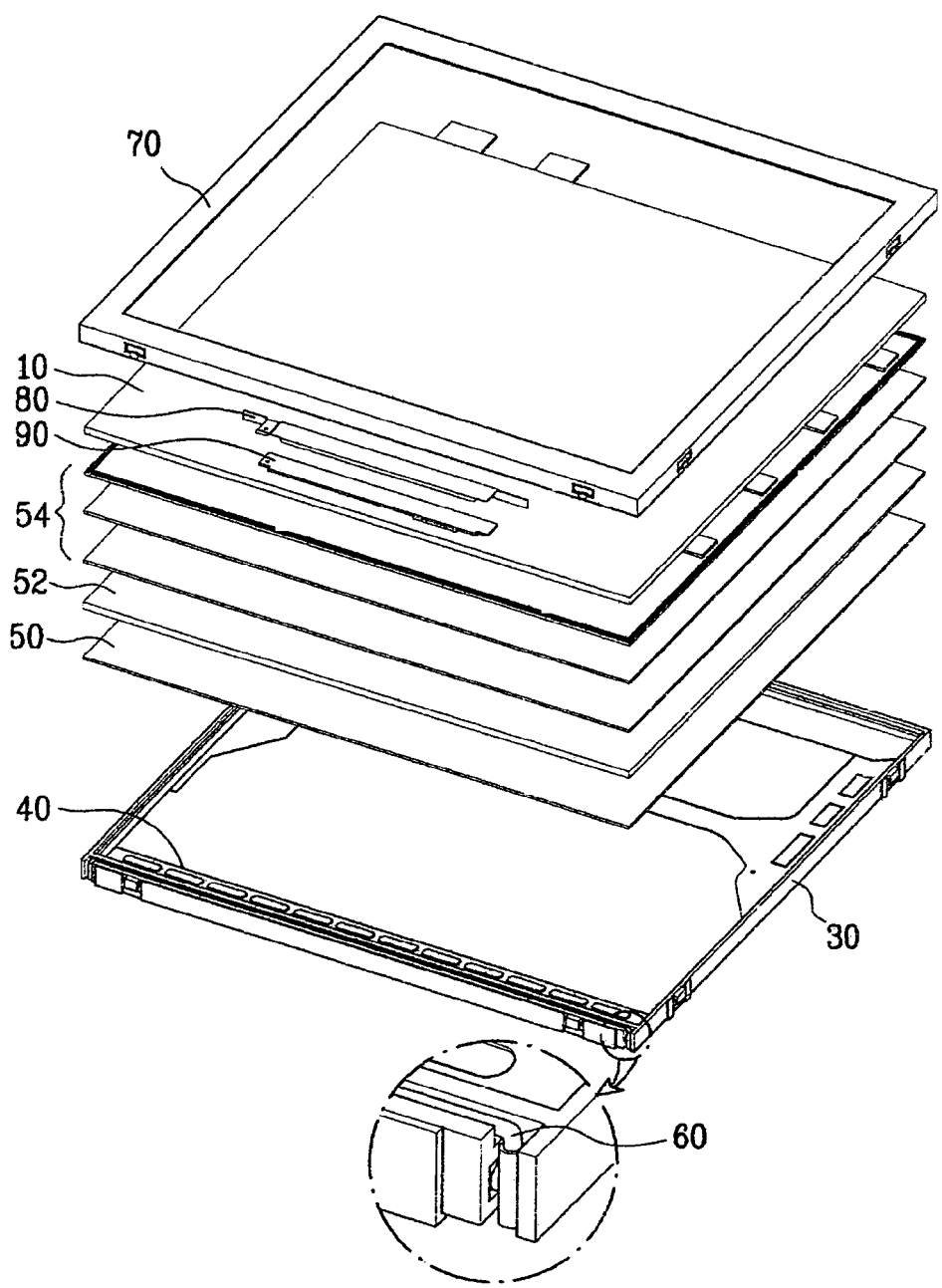
FIG. 1 illustrates a perspective view of a related art LCD.
Figure 2:
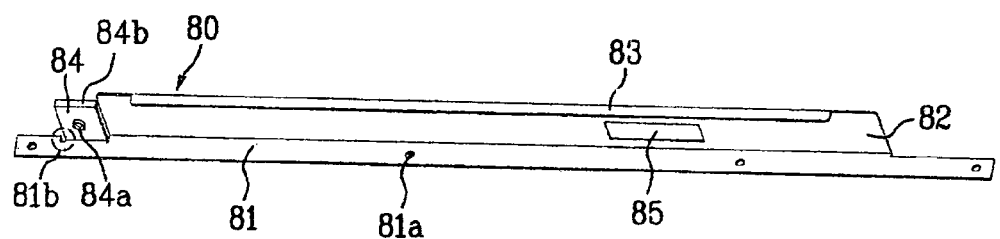
FIG. 2 illustrates a perspective view of a related art bracket.
Figure 3:
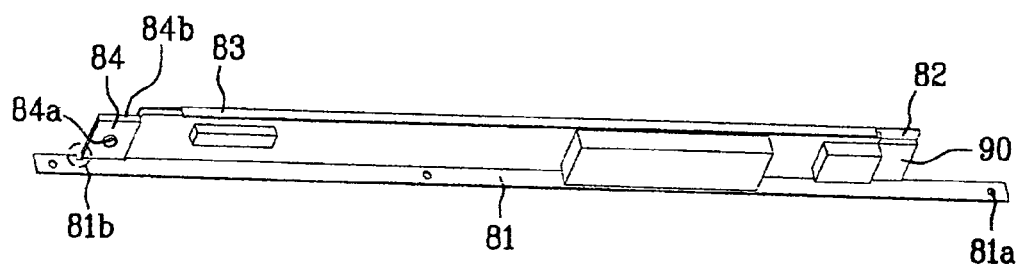
FIG. 3 illustrates a perspective view of an inverter fastened to a related art bracket.
Figure 4:
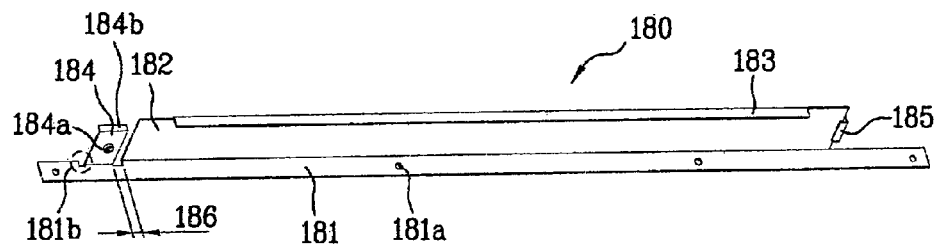
FIG. 4 illustrates a perspective view of a bracket for a liquid crystal display device in accordance with an embodiment of the present invention.

Reference will now be made in detail to the preferred embodiments of the present invention, examples of which are illustrated in the accompanying drawings. FIG. 4 illustrates a perspective view of a bracket 180 for a liquid crystal display device in accordance with a preferred embodiment of the present invention.

Referring to FIG. 4, the bracket 180 includes two fastening parts for inserting and holding opposite ends of an inverter 190 (see FIG. 5), and is fastened to a top case 70 of an LCD device. In an embodiment of the present invention, the inverter 190 may be a plate-like inverter, an inverter plate, or the like. The first fastening part comprises a second plate 184 and the second fastening part comprises a third plate 185.

More specifically, the bracket 180 includes a first plate 182 disposed next to the second plate 184 and the third plate 185. The bracket 180 also has a fourth plate 181 extending beyond both ends of the first plate 182 with screw holes 181a and a fifth plate 183.

Opposite ends of the fourth plate 181 have a width smaller than a width of a middle section of the fourth plate. Also, the plurality of screw holes 181a fasten the bracket 180 to the top case 70. The first plate 182 extends perpendicularly from a middle section of the fourth plate 181. The fifth plate 183 bends perpendicularly from the first plate 182 and extends in the same direction as the fourth plate 181.

1. Additionally, the fourth plate 181 includes a first fastening part comprising the second plate 184 extending from one end of the fourth plate 181. As may be seen in FIG. 4, the second plate 184 is spaced apart from the first plate 182. Moreover, the second plate 184 comprises an end 184b which extends toward the first plate 182. The end 184b is bent to have a '⊐' form, as illustrated in FIG. 4.

The height of the second plate 184 is less than the height of the first plate 182, as may be seen in FIG. 4.

Furthermore, a section of the fourth plate 181 where the first fastening part having the second plate 184 is located has a step 181b. Here, the second plate 184 extends from the fourth plate 181 in a cut-out as shown in FIG. 4 in order to create the step 181b in the fourth plate 181. In addition, the first fastening part has a fastening hole 184a in the second plate 184 for fastening a screw (not shown). The fastening hole 184a allows for rigid fastening of the inverter 190.

The first plate 182 has a second fastening part comprising the third plate 185 at one end thereof. The second fastening part surrounds and holds an end of the inverter 190. As may be seen in FIG. 4, the second fastening part extends from the first plate 182 to form a '⊏' shape.

In addition, a gap 186 is disposed between the second plate 184 of the first fastening part and the first plate 182. The gap 186 facilitates insertion of the inverter 190 into the bracket 180. The gap 186 allows for insertion of the inverter 190 into the '⊏' form of the second fastening part, which will be described in detail in the following description of the fastening process of the inverter 190 with the bracket 180.

Figure 5:
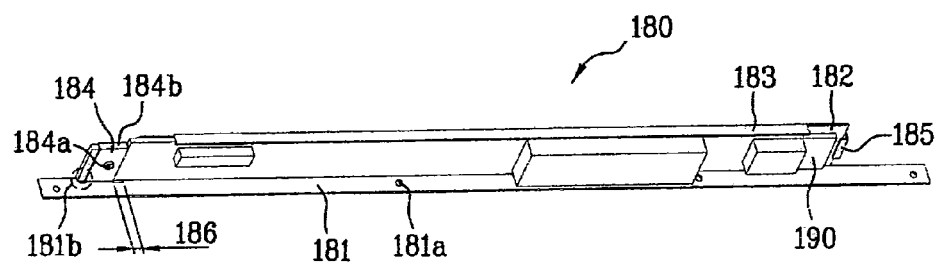
FIGS. 5 and 6 illustrate perspective views of an inverter fastened to a bracket.

Initially, the inverter 190 is slanted and inserted between the first fastening part comprising the second plate 184 and the first plate 182. The inverter 190 is then moved until the inverter 190 reaches a section where the step 181b is formed, as shown in FIG. 5. If an end of the inverter 190 is positioned at the step 181b, a middle of the inverter 190 is seated on the first plate 182. Here, if there is no gap 186, the inverter 190 interferes with the third plate 185 and does not contact the first plate 182.

If a gap is not formed and a length between the first fastening part and the second fastening part comprising the third plate 185 equals the length of the inverter 190, the inverter 190 may interfere with a lower surface of the second fastening part during seating on the first plate 182, thus failing to make close contact with the second plate 184.

Figure 6:
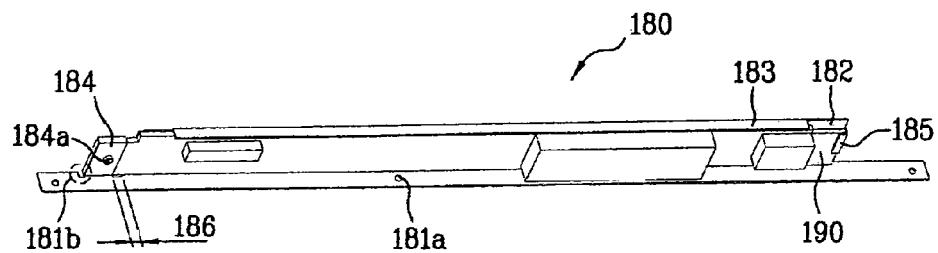

FIGS. 5 and 6 illustrate perspective views of fastening the inverter to the bracket 180. As may be seen, the inverter 190 is inserted in the bracket 180 and initially contacts a side of the bracket 180 where the step 181a is located, as shown in FIG. 5.

As shown in FIG. 6, when the inverter 190 moves toward the second fastening part, a right end of the inverter 190 inserts into the second fastening part. In addition, a left end of the inverter 190 becomes positioned opposite the fastening hole 184a of the first fastening part comprising the second plate 184. The right end of the inverter thus becomes positioned on the third plate 185.

Accordingly, the left end of the inverter 190 fastens to the first fastening part, and the right end inserts into the second fastening part such that the second fastening part holds the inverter 190. The inverter 190 comprises an elongated rectangular, thin inverter plate having a width corresponding to the distance between the fourth plate 181 and the fifth plate 183. The length of the inverter plate is selected such that both ends may be positioned simultaneously on the second plate 184 and the third plate 185. The thickness of the inverter plate corresponds (equals) to the distance between the first plate 182 and the second plate 184. Alternatively, the thickness may correspond to the distance between the first plate 182 and the third plate 185, respectively, in a direction perpendicular to the first plate 182.

The inverter plate carries on its surface, which faces away from the first plate 182, circuit elements or other devices used for operating the LCD device.

As has been described, a bracket for an LCD of the present invention has the following advantages.

Because the present invention does not use two face tape to fasten the inverter, the present invention obviates the need to attach two face tape and peel off cover paper, as previously discussed. Accordingly, fabrication times associated with the present invention are shortened, thereby improving productivity. Additionally, the absence of two face tape reduces material costs.

In addition, the present invention simplifies attachment and detachment of the inverter as this process simply involves the removal of a screw in order to detach the inverter from the bracket for inspection or the like.

What is claimed is:

1. A liquid crystal display device comprising:
a top case surrounding a periphery of a liquid crystal display panel;
an inverter for supplying a high voltage AC power to a lamp of the liquid crystal display device; and
a bracket being configured to fasten the inverter to the top case, wherein the inverter is inserted into at least two fastening parts of the bracket,
wherein a first end of the inverter is inserted into a first fastening part of the at least two fastening parts and a second end of the inverter opposite the first end of the inverter is inserted into a second fastening part of the at least two fastening parts, and
wherein the bracket comprises:
a first plate;
a second plate of the first fastening part having a height lower than a height of a first end of said first plate, and
a third plate of the second fastening part having a height lower than a height of a second end of said first plate opposite the first end of said first plate, where the first, second and third plates are parallel.

2. The liquid crystal display device according to claim 1, further comprising a gap disposed between the first plate and the second plate.

3. The liquid crystal display device according to claim 2, wherein the second plate has a ramp on a side nearest the third plate.

4. The liquid crystal display device according to claim 3, wherein the bracket comprises a fourth plate bent perpendicular from the first plate along its longitudinal direction, said fourth plate having a plurality of screw holes.

5. The liquid crystal display device according to claim 4, wherein the second plate is bent perpendicular from the fourth plate which extends beyond both ends of the first plate.

6. The liquid crystal display device according to claim 5, wherein the second plate extends from the fourth plate in a cut-out thereby creating a step in said fourth plate.

7. The liquid crystal display device according to claim 5, wherein an end of the second plate is bent toward the first plate.

8. The liquid crystal display device according to claim 4, wherein the bracket comprises a fifth plate is bent from said first plate such that the fifth plate is opposite the fourth plate.

9. The liquid crystal display device according to claim 8, wherein the inverter comprises an elongated rectangular plate having a length such that both ends thereof are positioned on said second plate and said third plate, respectively.

10. The liquid crystal display device according to claim 9, wherein said rectangular inverter plate has a width which corresponds to a distance between the fourth plate and the fifth plate.

11. A method of assembling a liquid crystal display device according to claim 10, comprising:

inserting one end of the inverter plate into the gap from below the first plate while keeping the inverter plate in an acute angle to the first plate;

moving the inverter plate against the lower surface of the first plate; and shifting the inverter plate toward the third plate such that another end of said inverter plate is positioned between said third plate and said first plate.

12. The liquid crystal display device according to claim 1, wherein the second plate has a fastening hole for fixing the inverter.

13. The liquid crystal display device according to claim 1, wherein the third plate is formed by bending the second end of the first plate.

* * * * *